W. R. CARLSON.
BEET HARVESTER.
APPLICATION FILED JUNE 24, 1919.

1,408,986.

Patented Mar. 7, 1922.
3 SHEETS—SHEET 1.

Fig. 1.

Inventor
William R. Carlson
By Lancaster and A. Verne
his Attorneys

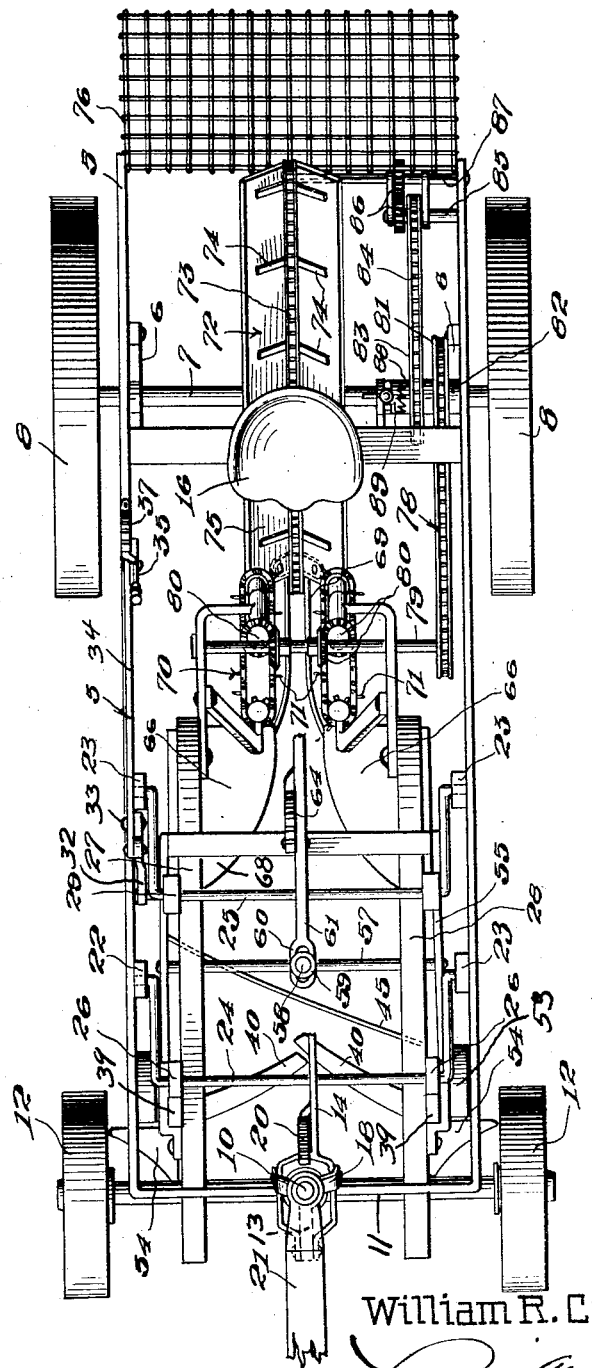

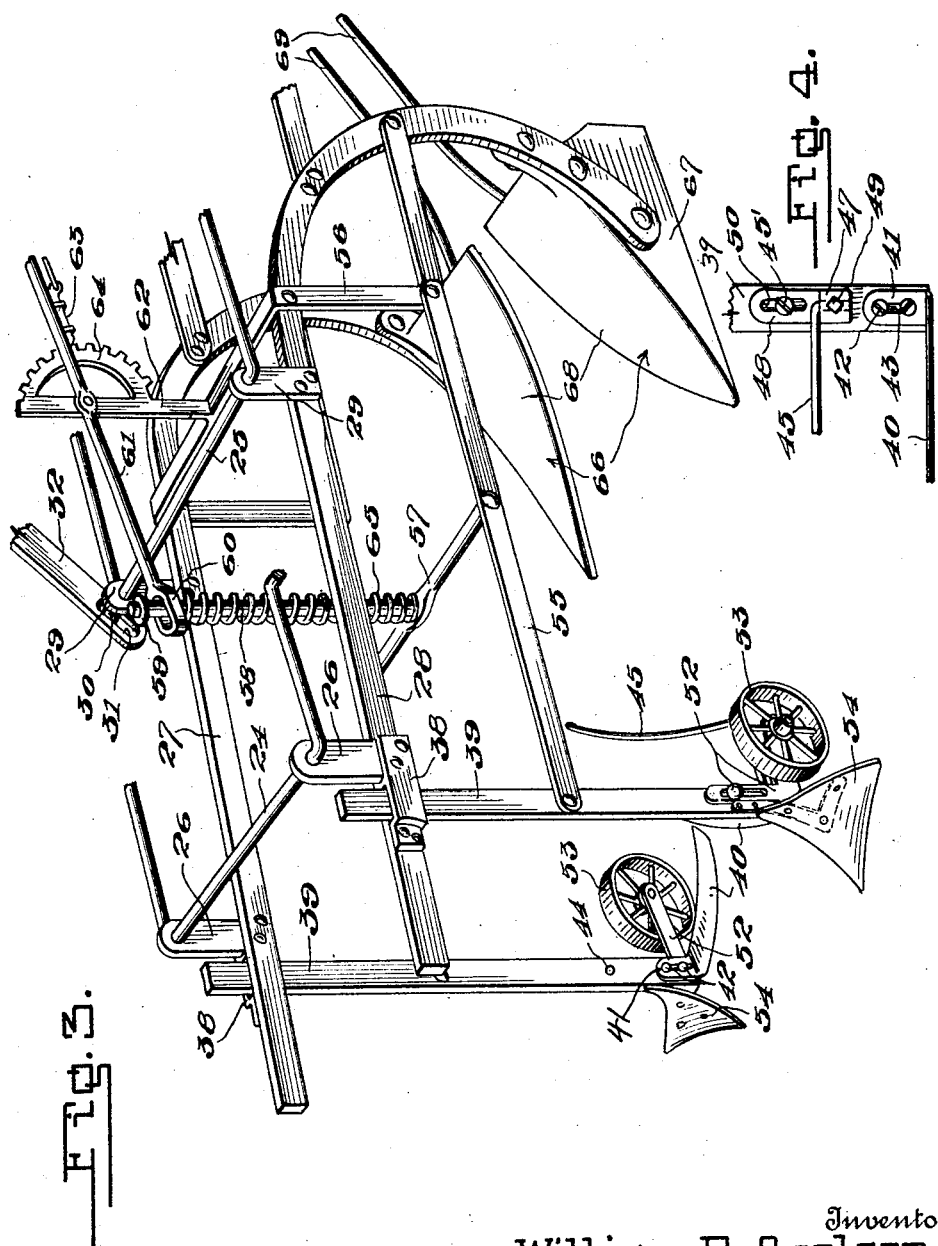

UNITED STATES PATENT OFFICE.

WILLIAM ROY CARLSON, OF WARRENTON, OREGON.

BEET HARVESTER.

1,408,986.　　　　　Specification of Letters Patent.　　Patented Mar. 7, 1922.

Application filed June 24, 1919. Serial No. 306,377.

*To all whom it may concern:*

Be it known that I, WILLIAM R. CARLSON, a citizen of the United States, residing at Warrenton, in the county of Clatsop and State of Oregon, have invented certain new and useful Improvements in Beet Harvesters, of which the following is a specification.

This invention relates to beet harvesters, and an object of the invention is to provide an implement for topping or crowning the beets and subsequently uprooting them and depositing them free of dirt into a suitable receptacle, carried by the beet harvester structure.

Another object of the invention is to provide, in a beet harvester, uprooting shovel carrying means, which are supported from the main supporting structure of the beet harvester by a pair of crank rods, to one of which a lever is connected, for adjusting the elevation of the beet uprooting plows and to provide a pair of standards slidably supported near the forward ends of said beams and carrying beet crowning knives at their lower ends, which standards are adjusted, with respect to the uprooting plows and their carrying means through the medium of a pivotally mounted lever, permitting adjustment of the crowning knives independently of or in connection with the uprooting plows, and further to provide means for adjusting the gauge wheel of the supporting structure for adjusting the elevation of the forward end of the supporting structure with respect to the rear supporting axle.

Other objects of the invention will appear from the following detailed description taken in connection with the accompanying drawings, forming a part of this specification and in which drawings:

Figure 1 is a longitudinal section through the improved beet harvester.

Figure 2 is a top plan of the beet harvester.

Figure 3 is a detail perspective of the uprooting plow carrying beam and the crowning structure which is adjustably carried by the plow carrying beam, and Figure 4 is a detail view illustrating the manner of connection of the topping device to the crowning knife carrying beams or standards.

Referring more particularly to the drawings, wherein like characters indicate like and corresponding parts throughout the several views, 5 indicates the main supporting structure of the beet harvester which has a pair of bearings 6 carried thereby. The bearings 6 rotatably support the rear or main supporting axle 7 upon which the supporting ground or tractive wheels 8 are mounted. The forward end of the supporting frame 5 has a sleeve 9 connected thereto which slidably supports, for vertical adjustment, a standard 10, the lower end of which carries the front axle 11 upon which steering or guiding front wheels 12 are mounted. The sleeve 9 has a forwardly projecting ear 13 thereon to which a relatively long lever 14 is connected. The lever 14 extends rearwardly so that the hand grip 15 thereof may be conveniently reached by a person from the seat 16. The seat 16 is the usual construction employed in agricultural implements, being supported by the spring standard 17. The lever 14 has a yoke 18 connected thereto intermediate its pivots and the hand grip 15 which yoke is connected to the standard 10 for raising or lowering this standard upon pivotal movement of the lever 14. The lever 14 carries the dog mechanism 19 which co-acts with a segmental rack 20 for holding the lever and consequently the standard 10 and front axle 11 which is carried thereby in adjusted elevation, to permit regulating of the elevation of the front end of the supporting frame 5 with respect to the rear end thereof.

The draft and tongues 21 are of any approved construction and connected to the upper end of the standard 10. The supporting frame 5 has depending brackets 22 and 23 carried thereby arranged in pairs, which depending brackets rotatably support rods 24 and 25. The crank rod 24 which is carried by the forward pair of the depending brackets is connected by means of upstanding brackets 26 to the spaced beams 27 and 28 while the rear crank rod 25 is connected by means of upstanding brackets 29 with the beams 27 and 28 rearwardly of the connection of the crank rod 24 therewith. The gauge crank rods 24 and 25 support the beams 27 and 28 for relative movement with respect to the frame 5, and the crank rod 25 has an extension 30 thereon which extends through the slot 31 in the lower end of a crank arm 32. The crank arm 32 is in turn pivotally supported as shown at 33 and is connected to a bar 34. The bar 34 is pivotally connected to a hand lever 35, pivotally carried by the frame 5 and adapted to rock the crank rods 24 and 25 to move the beams 27 and 28 with respect to the frame 5. The usual type of dog mechanism 36 is carried by the lever 35 and co-acts with a quadrant 37 for holding the lever and consequently the beams in adjusted position.

Straps or brackets 38 are carried by the beams 27 and 28 near their forward ends, and these straps are attached to the beams by means of the bolts, rivets or the like which are employed for attaching the brackets 26 to the respective beams. Each of the guides or straps 38 is provided with an opening through which a vertical standard 39 extends. The standards 39 have beet crowning blades 40 detachably connected to the inner sides and their lower ends, by means of upstanding ears 41 formed upon the crowning blades and screws or bolts 42. The crowning blades 40 extend inwardly toward the longitudinal center of the beet harvester from each side thereof as clearly shown in Figure 2 of the drawings, and the inner end of one blade or knife overlaps the inner end of the other knife, so as to prevent space between the knives and to insure the crowning of the beet. The ears 41 are provided with slots 43 through which the screws 42 extend, to permit limited adjustment of the connection of the knives 40 with the lower ends of the standards 39.

Each of the standards 39 is provided with an opening 44 above the ears 41, and this opening is adapted to receive the attaching bolts 45' of the top guide structure. The top guide structure includes a rearwardly angling horizontal rod 45, which extends transversely of the beet harvester for guiding the top and crown cut from beets by the knives 40 to one side of the row of growing beets. This guiding rod 45 has its attaching end angled, and rotatably seated in a socket 47 formed upon the attaching plate 48, in which socket the downturned or angled end of the rod is held against rotation by means of a set screw 49. The attaching plate 48 is provided with a slot 50 which receives the bolt 45' therethrough to permit adjustment of the elevation of the rod 45.

The bracket arms 52 are adjustably connected to each of the standards 39 and they rotatably support gauge wheels 53 and stubbles or blades 54 are also attached to the lower ends of the standards and are positioned in front of the gauge wheels 53 for leveling the ground in front of the gauge wheels to cause these wheels to travel in substantially the same horizontal plane for properly topping or crowning the beets in a row. Bars 55 are connected to the standards 39 and are pivotally connected at their rear ends to a bracing structure 56 in its turn carried by the beams 27 and 28. The pivoted bars 55 are connected intermediate their ends by a cross rod 57 from which a vertical rod 58 rises. A head or collar 59 is carried at the upper end of the vertical rod 58 and the enlarged perforated end 60 of a hand lever 61 engages about the upper end of the vertical rod 58 below the head or collar 59. The lever 61 is pivotally supported by an upstanding arm 62 formed upon the structure 56 and it carries a dog mechanism 63 for co-action with a quadrant 64. When the lever 61 is moved downwardly, at its hand grip end, the enlarged end 60 thereof may be elevated, which will raise the bars 55 and consequently move the standards 39 upwardly for raising the elevation of the knives 40. The knives 40, and the standards 39 are yieldably maintained in their lowered positions by a spiral spring 65 which is coiled about the upstanding rod 58.

After the beets are crowned or topped, they are uprooted by the uprooting plows 66 which are carried by the lower rear ends of the beams 27 and 28. These plows are disposed in opposed relation to each other, and include land sides 67 and mold boards 68, which engage beneath and upon each side of the beets and uproot them, the beets and portions of the soil which surrounds the beets travelling upwardly over the mold boards 68 of the plows and being guided by the guiding rods 69 to the conveyor structure 70. This conveyor structure 70 comprises spaced sprocket chains the inner facing runs of which travel upwardly, and which sprockets have tines or teeth 71 thereon for engaging the beets and elevating them over the rods 69 which are spaced a sufficient distance to permit the dirt which might adhere to the beet to fall therefrom. The beets are delivered by the chains of the conveyor structure 70 to an elevator structure 72, comprising an endless chain 73 having slides 74 thereon, the upper travelling run of which chain travels through a trough like structure 75 for elevating the beets and depositing them in a foraminous receptacle 76 carried at the rear end of the supporting structure 5 in which foraminous carrier or receptacle the beets may be retained until it is desired to empty them or the receptacle becomes filled, at which time the beets may be dumped in piles on the fields on which they are harvested, or dumped in any suitable receptacle by the lowering of the hinged doors 77 which form the bottom for the receptacle 76.

The conveyor structure 70 is operated from the rear axle 7, through the medium of a sprocket and chain power transmission mechanism 78, a shaft 79 and sets of miter gears 80. The sprocket 81 of the sprocket and chain power transmission mechanism 78 is mounted upon a sleeve 82 which in turn is rotatably mounted upon the axle 7. This sleeve 82 carries a sprocket 88 which is connected by a sprocket chain 84 to a stub shaft 85. This stub shaft 85 is connected by means of gears 86 with a shaft 87, which is in turn operatively connected to the upper guiding sprocket of the chain 73. The clutch section 88 is carried by the sleeve 82 and co-acts with a clutch section 89 which is feathered upon the axle 7 for controlling the rotation of the sleeve 82 and consequently of the sprockets 81 and chain 83 by the rotation of the axle 7.

In operation, the beet crowning structure and the uprooting plows 66 are adjusted to the desired elevations with respect to each other and the supporting frame 5. When the harvester is driven over a row of beets, the ground will be leveled in front of the gauge wheels 53, causing the uniform cutting of the tops and crowns from the beet by the knife 40, which tops and crowns are guided laterally of the row by the guiding arms or rods 45. After the beets have been properly crowned and the tops guided to one side of the row, the beets are engaged by the uprooting plows 66 and drawn out of the ground, passing upwardly over the surface of the mold boards of the plows and being elevated over the spaced guiding rods 69 by the conveyor structure 70 from which they are engaged by the elevator structure 72 and deposited in the foraminous receptacle 76.

Changes in details may be made without departing from the spirit of this invention, but;

I claim:

1. In a beet harvester, the combination of a supporting frame, a beam carried by said supporting frame, means for adjusting the elevation of said beam relative to said frame, a standard pivotally supported by said beam, and means for vertically adjusting the elevation of an end of the standard relative to said beam.

2. In a beet harvester, the combination of a supporting frame, a pair of crank rods rockably carried by the said frame, a beam carried by said crank rods, the elevation of said beam relative to said frame being adjusted by rocking of said crank rods, a standard pivotally supported by said beam, and means for vertically adjusting the elevation of an end of the standard relative to the beam.

3. In a beet harvester, the combination of a supporting frame, a beam carried by said supporting frame, means for adjusting the elevation of said beam relative to the frame, a standard pivoted at an end to said beam, means for adjusting the elevation of the free end of said standard, means normally urging said standard downwardly, and beet crowning means carried by the lower end of said standard.

4. In a beet harvester, the combination of a supporting frame, a pair of beams, crank shafts connecting said beams to said supporting frame, means for operating said crank shafts to adjust the elevation of said beams with respect to said supporting frame, standards, bars pivotally connecting said standards and said beams, means for operating said bars for vertical reciprocation of said standards, and beet topping knives adjustably carried by the lower end of said standards.

WILLIAM ROY CARLSON.